June 21, 1960
J. D. McGHEE
2,942,185
MEASURING APPARATUS
Filed Sept. 3, 1954
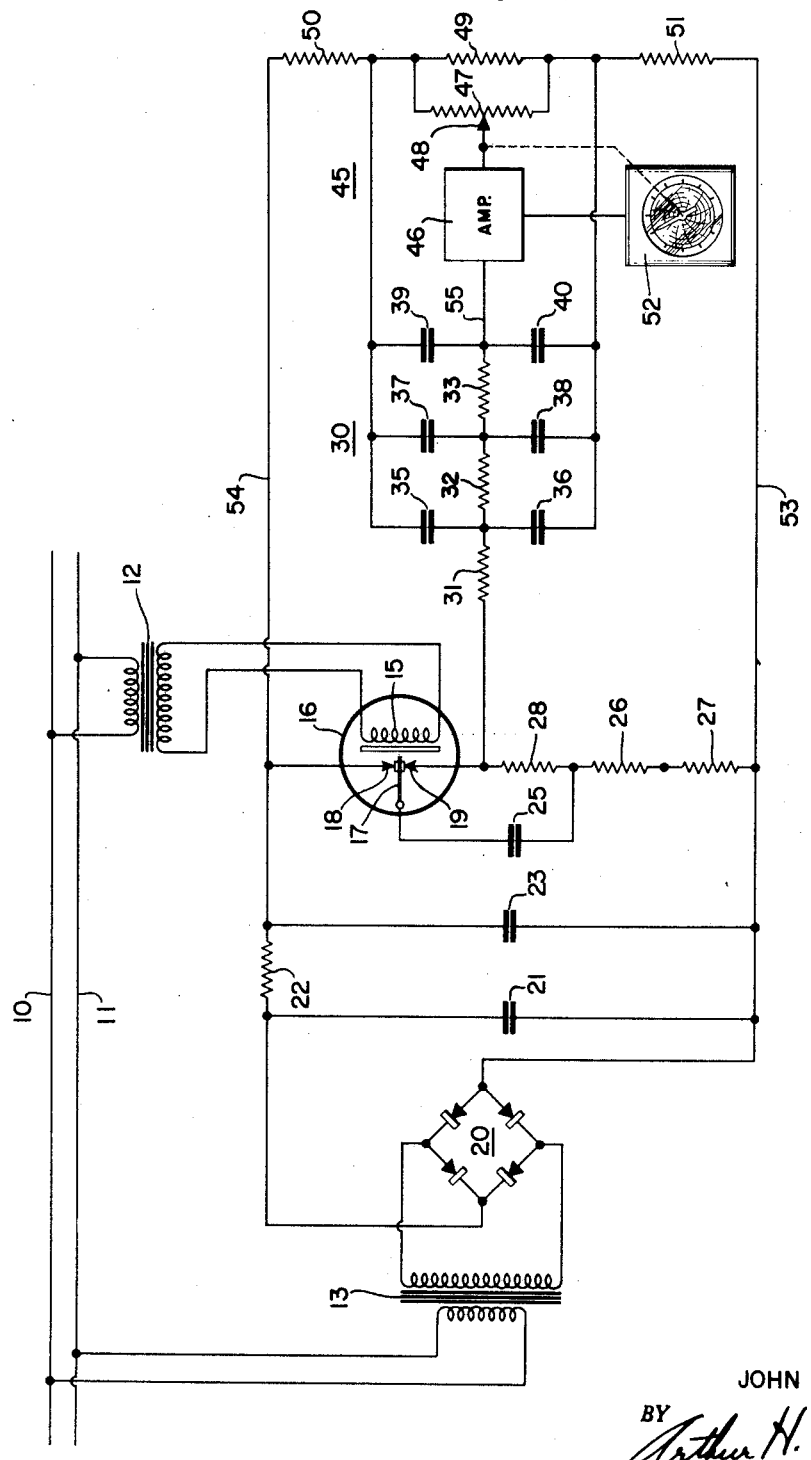
INVENTOR.
JOHN D. McGHEE
BY Arthur H. Swanson
ATTORNEY.

United States Patent Office 2,942,185
Patented June 21, 1960

2,942,185
MEASURING APPARATUS

John D. McGhee, Philadelphia, Pa., assignor to Minneapolis-Honeywell Regulator Company, Minneapolis, Minn., a corporation of Delaware Filed Sept. 3, 1954, Ser. No. 454,031

9 Claims. (Cl. 324—78)

A general object of the present invention is to provide an improved apparatus for measuring the frequency of alternations on an alternating current power line. More specifically, the present invention is concerned with an alternating current frequency measuring apparatus which is characterized by its accuracy and freedom from error due to transients and leakage present in the circuit.

In a copending application of William H. Wannamaker, Jr., entitled "Measuring Apparatus," filed October 30, 1953 and bearing Serial No. 389,217, now Patent No. 2,891,220, there is disclosed a frequency meter which depends in its operation upon the production of a series of direct current pulses of uniform amplitude with the pulse rate being variable in accordance with the measured frequency. The direct current pulses are passed through a filter and applied to the input of a potentiometric measuring apparatus which is calibrated in terms of frequency. The present invention utilizes the principles of the frequency measuring apparatus of the Wannamaker application and includes a new and novel filter which is simple and yet minimizes the offset errors which may arise in the input filter to the potentiometric measuring apparatus.

The problem of offset error arises in the present apparatus when transient voltages are present in the power supply line. The transient voltages in conventional filters have caused offsets in the frequency indication to be present during the transient change. This was due in part to the time lag in the filter and the fact the filter did not act symmetrically on the rebalancing potentiometer of the measuring circuit.

Additional offset error in apparatus of the present type may arise from the presence of leakage resistance in condensers used in the filter. The leakage resistance is difficult to detect and its presence may cause an undesirable error in the final frequency indication.

It is accordingly a more specific object of the present invention to provide an improved filtering apparatus for use with a potentiometric measuring instrument wherein the filter apparatus is arranged so that the effects of voltage transients and leakage in the filter condensers will not introduce a transient and offset error.

Still another more specific object of the present invention is to provide an improved potentiometric measuring apparatus having an input filter wherein the leakage resistance of the filter condensers are balanced to eliminate the tendency for there to be an offset in the final indication of the potentiometric apparatus.

A still further object of the present invention is to provide an improved filter for potentiometric measuring apparatus having a balancing slidewire resistor arranged so that it appears balanced with respect to the slidewire resistor of the measuring apparatus.

The various features of novelty which characterize the invention are pointed out with particularity in the claims annexed hereto and forming a part of this specification. For a better understanding of the invention, its advantages, and specific objects attained with its use, reference should be had to the accompanying drawings and descriptive matter in which there is illustrated and described a preferred embodiment of the invention.

Referring to the single figure, numerals 10 and 11 identify an alternating current power line whose alternating frequency is to be measured. Connected to the lines 10 and 11 are a pair of transformers 12 and 13. The transformer 12 supplies an alternating signal to the driving coil 15 of a synchronously driven vibrating contactor 16. The vibrating contactor is of the single pole double throw type and includes a blade 17, and a pair of contacts 18 and 19.

The transformer 13 supplies energy to a rectifier bridge 20 of conventional type. Connected to the output of the rectifier bridge 20 is a filter network comprising a condenser 21, a resistor 22, and a condenser 23.

The synchronous vibrator 16 is used to alternately connect a condenser 25 to be charged through a pair of resistors 26 and 27 and discharged through a resistor 28 so as to produce a series of direct current pulses in a manner to be described below.

Connected to the upper end of the resistor 28 is a filter circuit 30. This filter comprises a plurality of series connected resistors 31, 32, and 33. In addition, the filter 30 comprises a plurality of condensers 35, 36, 37, 38, 39, and 40.

The output of the filter 30 is connected to a potentiometric measuring circuit 45 which may well be of the type disclosed in the patent to Walter P. Wills, No. 2,423,540, issued July 8, 1947. This measuring circuit includes an amplifier 46, a balancing slidewire resistor 47 having a slider 48 cooperating therewith, a resistor 49 in parallel therewith, and a pair of resistors 50 and 51 connected between the ends of the slidewire resistor 47 and the direct current power supply filter. In addition, the measuring circuit includes a balancing motor and indicator mechanism indicated generally by the numeral 52.

In considering the operation of the present apparatus, it should first be noted that on lines 53 and 64 there exists a direct current potential produced by the rectifier 20. It should also be noted that the blade 17 of the synchronous vibrator 16 will be alternately switched between the contacts 18 and 19 at a rate dependent upon the alternating frequency appearing upon the power lines 10 and 11. When the blade 17 is moved in an upward direction so as to engage the contact 18, a charging circuit for the condenser 25 may be traced from the lead 54 through condenser 25 and resistors 26 and 27 to the other direct current lead 53. This will produce across the resistors 26 and 27 a direct current pulse. The time constant of this circuit is selected so that the condenser 25 will be charged to substantially the full line voltage between the lines 53 and 54 so that the direct current pulse across resistors 26 and 27 will be of uniform amplitude each time the pulse occurs.

On the next half cycle of the alternating current frequency in the lines 10 and 11, the coil 15 will drive the blade 17 in a downward direction so that the blade will engage contact 19. When this occurs, the condenser 25 is connected in series with the resistor 28 and the condenser is discharged through the resistor. This will produce a further direct current pulse. The pulse on the resistor 28 will be of substantially the same amplitude as the pulse produced across the resistors 26 and 27.

The direct current pulses produced across the resistors 26 and 27 and across the resistor 28 are of substantially uniform amplitude. These pulses are applied to the filter 30 and this filter serves to produce an average direct current on its output lead 55 which is proportional to the rate at which the direct current pulses are applied to the input of the filter. The potential on the filter output lead 55 is applied to one of the input terminals of the amplifier 46. The other input to the amplifier 46 is derived from the slidewire resistor 47 by way of the slider 48. If the slider 48 is positioned upon the slidewire resistor 47 so that the potential thereof is the same as that on the lead 55, there will be no output from the amplifier 46 and the balancing motor and indicator 52 will remain stationary. If the direct current potential on the lead 55 should be different than the potential upon the slider 48, there will be an output from the amplifier 46 which will drive the balancing mechanism and the slider 48 until a balance point has been reached.

In a frequency meter of the present type, it is conventional practice to calibrate the instrument so that the indicator will be centered on the indicator scale when the apparatus is measuring the desired frequency. When the indicator is so centered, the slider 48 is centered upon the slidewire resistor 47.

If a voltage transient should appear on the power lines 10 and 11, this transient will be reflected to the lines 53—54 by way of the rectifier 20 and its output filter 21–23. When prior art filters were used in the filter 30, the line voltage transient would cause an unbalance signal to appear on the input of the amplifier 46. This was due to the slider 48 immediately following the transient and the filter on lead 55 delaying the effect of the transient on the other input lead to produce an error signal on the amplifier. With the present filter 30 connected symmetrically with respect to the slidewire resistor 47, line voltage transients will cause the potentials on lead 55 and slider 47 to remain the same during the transient.

In addition, with a conventional type of filter of the prior art type, it has been found that leakage resistance in the filter condensers will cause an apparent shift in magnitude of the direct current output of the filter. Thus, while the frequency on the lines 10 and 11 might be of the desired value, the slider 48 might be slightly displaced from its center position due to the leakage resistance of the filter. In the present invention, this has been eliminated by the provision of a filter which is balanced with respect to the slidewire resistor 47. This balancing is accomplished by selecting the condensers 35 and 36 to be of equal magnitude and of the same type so that the leakage resistance will be balanced. Similarly, the condensers 37 and 38 as well as the condensers 39 and 40 are selected to be of equal magnitude and of the same type so as to eliminate the effect of leakage. Thus, with this balanced filter, the potential of the lead 55 will be the same as that on the slider 48 when the slider is centered and there is no input signal to the filter.

With this arrangement, the direct current potential on the leads 53 and 54 may change in amplitude without any danger of shift in the balance of the apparatus. This freedom from shift will result from two factors, the first being the presence of the balanced filter 30 with its leakage resistance balanced. The second factor being that the potential on the slidewire resistor 47 is supplied from the leads 53 and 54 which is also the source for the direct current pulses originating from the charging and discharging of the condenser 25. This arrangement permits the attainment of a degree of accuracy greater than heretofore possible.

While, in accordance with the provisions of the statutes, there has been illustrated and described the best form of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure Letters Patent is:

1. In an alternating current frequency measuring apparatus, the combination comprising, means producing a series of direct current pulses of uniform magnitude proportional to the frequency to be measured, a potentiometric measuring apparatus including a slidewire resistor and a cooperating slider, a direct current source of potential connected to the ends of said slidewire resistor, and a direct current pulse filter connected between said first named means and said measuring apparatus, said filter having terminal connections to both ends of said slidewire resistor so that said filter is electrically balanced with respect to said slidewire resistor.

2. In an alternating current frequency measuring apparatus, the combination comprising, means producing a series of direct current pulses of uniform magnitude proportional to the frequency to be measured, a potentiometric measuring apparatus including a slidewire resistor and a cooperating slider, a direct current source of potential connected to the ends of said slidewire resistor, and a direct current pulse filter connected between said first named means and said measuring apparatus, said filter comprising a resistance circuit connected between an input terminal of said potentiometric measuring apparatus and said first named means, and capacity means connected from said resistance circuit to the opposite ends of said slidewire resistor.

3. In an alternating current frequency measuring apparatus, the combination comprising, means producing a series of direct current pulses of uniform magnitude proportional to the frequency to be measured, a potentiometric measuring apparatus including a slidewire resistor and a cooperating slider, a direct current source of potential connected to the ends of said slidewire resistor, and a direct current pulse filter connected between said first named means and said measuring apparatus, said filter comprising a pair of resistors connected in series between an input to said potentiometric measuring apparatus and said first named means, a first condenser connected between the junction of said pair of resistors and one end of said slidewire resistor, and a second condenser connected between said junction and the other end of said slidewire resistor, said resistors and condensers forming a balanced filter network.

4. A frequency measuring apparatus for an alternating current line comprising an input transformer adapted to be energized by said line, a rectifier connected to said transformer to produce a direct current power supply, a synchronously driven vibrating switch having a driving coil connected to be energized from said alternating current line, a condenser, a pair of interconnected resistors, means including said switch for alternately connecting said condenser in a charging circuit through one of said resistors to said power supply and in a discharging circuit through the other of said resistors, a potentiometric measuring apparatus including a balancing slidewire resistor having an adjustable slider, means connecting the ends of said slidewire resistor to said direct current power supply, and a filter connecting one end of said pair of resistors to the input of said measuring apparatus, said filter comprising a balanced capacity circuit connected to the opposite ends of said slidewire resistor.

5. A frequency measuring apparatus for an alternating current line comprising an input transformer adapted to be energized by said line, a rectifier connected to said transformer to produce a direct current power supply, a synchronously driven vibrating switch having a driving coil connected to be energized from said alternating current line, a condenser, a pair of interconnected resistors, means including said switch for alternately connecting said condenser in a charging circuit through one of said resistors to said power supply and in a discharging circuit through the other of said resistors, a potentiometric measuring apparatus including a balancing slidewire resistor having an adjustable slider, means connecting the ends of said slidewire resistor to said direct current power supply, a resistance circuit connecting one end of said pair of resistors to the input of said potentiometric measuring apparatus, and a plurality of condensers connected between said resistance circuit and the opposite ends of said slidewire resistor.

6. A frequency measuring apparatus for an alternating current line comprising an input transformer adapted to be energized by said line, a rectifier connected to said transformer to produce a direct current power supply, a synchronously driven vibrating switch having a driving coil connected to be energized from said alternating current line, a condenser, a pair of interconnected resistors, means including said switch for alternately connecting said condenser in a charging circuit through one of said resistors to said power supply and in a discharging circuit through the other of said resistors, a potentiometric measuring apparatus including a balancing slidewire resistor having an adjustable slider, means connecting the ends of said slidewire resistor to said direct current power supply, a pair of balanced condensers connected in series to the ends of said slidewire resistor, and a resistance circuit connected between one end of said pair of resistors, an input to said potentiometric measuring apparatus, and connected to the junction of said pair of condensers.

7. An electrical measuring apparatus comprising a source of unidirectional potential, a variable responsive means connected to said source to produce a unidirectional signal potential proportional to the magnitude of the variable, amplifying means having a pair of input terminals and having a reversible motor connected to be controlled thereby, a potentiometric slidewire resistor having a slider, means connecting the ends of said resistor to said source of unidirectional potential, means connecting said slider to one of said amplifier input terminals, means connecting the signal potential from said variable responsive means to the other of said input terminals of said amplifier, means connecting said motor to drive said slider in a signal balancing direction on said resistor, and a balanced filter connected between the ends of said resistor and the other of said input terminals of said amplifier.

8. Apparatus as defined in claim 7 wherein said balanced filter comprises at least a pair of condensers connected in series and to the ends of said slidewire resistor with the junction of said condenser being connected to a filter resistor of said balanced filter.

9. Apparatus as defined in claim 7 wherein said balanced filter comprises a filter resistor, a first pair of condensers connected in series to the ends of said slidewire resistor and to said filter resistor at one end thereof, and a second pair of condensers connected in series to the ends of said slidewire resistor and to said filter resistor at the other end thereof.

References Cited in the file of this patent

UNITED STATES PATENTS

| | | |
|---|---|---|
| 2,104,801 | Hansel | Jan. 11, 1938 |
| 2,119,389 | Hunt | May 31, 1938 |
| 2,432,390 | Darby | Dec. 9, 1947 |
| 2,446,188 | Miller | Aug. 3, 1948 |
| 2,523,297 | Hastings | Sept. 26, 1950 |
| 2,535,027 | Anderson | Dec. 26, 1950 |
| 2,595,297 | Relis | May 6, 1952 |

FOREIGN PATENTS

| | | |
|---|---|---|
| 699,036 | Great Britain | Oct. 28, 1953 |
| 713,680 | Great Britain | Aug. 18, 1954 |